US012781766B2

(12) United States Patent
Miller et al.

(10) Patent No.: US 12,781,766 B2
(45) Date of Patent: Nov. 3, 2026

(54) PUMP ASSEMBLY AND IMPROVED FAN SHROUD THEREFOR

(71) Applicants: Pentair Water Pool and Spa, Inc., Cary, NC (US); Danfoss Power Electronics A/S, Graasten (DK)

(72) Inventors: James Miller, Sanford, NC (US); Montie Roland, Sanford, NC (US); Kevin Stewart, Apex, NC (US); Ryan Drabek, Loves Park, IL (US); George Miller, Loves Park, IL (US); Shawn Rink, Loves Park, IL (US); Marvin Garcia, Loves Park, IL (US)

(73) Assignees: Pentair Water Pool and Spa, Inc., Cary, NC (US); Danfoss Power Electronics A/S, Graasten (DK)

( * ) Notice: Subject to any disclaimer, the term of this patent is extended or adjusted under 35 U.S.C. 154(b) by 721 days.

(21) Appl. No.: 17/195,225

(22) Filed: Mar. 8, 2021

(65) Prior Publication Data

US 2021/0277915 A1 Sep. 9, 2021

Related U.S. Application Data

(60) Provisional application No. 62/986,417, filed on Mar. 6, 2020.

(51) Int. Cl.
*F04D 29/58* (2006.01)
*F04D 13/14* (2006.01)
(Continued)

(52) U.S. Cl.
CPC ......... *F04D 29/5806* (2013.01); *F04D 13/14* (2013.01); *F04D 29/5813* (2013.01); *H02K 9/14* (2013.01); *H02K 11/33* (2016.01)

(58) Field of Classification Search
CPC .... F04D 13/0686; F04D 13/14; F04D 29/403; F04D 29/5806; F04D 29/5813;
(Continued)

(56) References Cited

U.S. PATENT DOCUMENTS 3,250,926 A 5/1966 O'Reilly et al.
4,892,464 A 1/1990 Schydlo
(Continued)

FOREIGN PATENT DOCUMENTS

CN 207234614 U * 4/2018
EP 0456169 A2 11/1991
(Continued)

OTHER PUBLICATIONS

Examination Report issued for European Patent Application No. 21161379.9 dated Mar. 13, 2023, 8 pages.
(Continued)

*Primary Examiner* — Charles G Freay
*Assistant Examiner* — Joseph S. Herrmann
(74) *Attorney, Agent, or Firm* — Husch Blackwell LLP

(57) ABSTRACT

A fan shroud for a pump assembly having a pump, a motor and a drive. The fan shroud includes a fan shroud end cap coupled to a rear bell end of the motor, the fan shroud end cap having a vented surface for receiving cool air drawn by a motor fan during operation of the motor. The fan shroud further includes an extended shell sidewall extending from the fan shroud end cap across a length of the motor, and the fan shroud end cap and the extended shell sidewall are configured to surround the motor.

19 Claims, 10 Drawing Sheets

(51) Int. Cl.
*H02K 9/14* (2006.01)
*H02K 11/33* (2016.01)

(58) Field of Classification Search
CPC ........ F04D 29/08; F04D 29/086; F04D 29/40; F04D 29/58; F04D 29/582; F04D 29/584; F04D 29/586; F04D 29/588; F04D 29/701; F04D 29/703; H02K 9/14; H02K 11/33; H02K 9/06; H02K 9/18; H02K 9/227; H02K 5/18; H02K 5/207; H02K 5/22; H02K 5/225; H05K 7/20136; H05K 7/20145; H05K 7/20909; H05K 5/0213; H01H 2009/343; H01F 27/085
See application file for complete search history.

(56) References Cited

U.S. PATENT DOCUMENTS

| | | | | |
|---|---|---|---|---|
| 5,763,969 | A | 6/1998 | Metheny et al. | |
| 5,789,829 | A | 8/1998 | Heesemann | |
| 6,324,057 | B1 * | 11/2001 | Baran | H05K 7/142 361/796 |
| 7,923,875 | B2 | 4/2011 | Henry et al. | |
| 7,977,832 | B2 | 7/2011 | Vadillo et al. | |
| 8,350,423 | B2 | 1/2013 | Vadillo et al. | |
| 8,760,017 | B2 | 6/2014 | Henke et al. | |
| 8,896,166 | B2 | 11/2014 | Hofkirchner et al. | |
| 8,937,415 | B2 | 1/2015 | Shimono | |
| 9,000,631 | B2 | 4/2015 | Prix | |
| 9,190,887 | B2 | 11/2015 | Ito et al. | |
| 9,494,145 | B2 | 11/2016 | Stork et al. | |
| 9,543,807 | B2 | 1/2017 | Nielsen et al. | |
| 9,812,920 | B2 | 11/2017 | McKinzie et al. | |
| 10,030,647 | B2 | 7/2018 | Ortiz et al. | |
| 2002/0114697 | A1 * | 8/2002 | Hsiorn | F04D 29/582 415/175 |
| 2005/0158194 | A1 * | 7/2005 | Sloan | F04D 9/02 417/423.1 |
| 2007/0273220 | A1 | 11/2007 | Koyama et al. | |
| 2009/0289513 | A1 * | 11/2009 | Vadillo | H02K 11/33 310/63 |
| 2013/0076172 | A1 | 3/2013 | Koyama et al. | |
| 2015/0001973 | A1 * | 1/2015 | Mikkelsen | F04D 29/5806 310/64 |
| 2015/0076942 | A1 | 3/2015 | Madsen Obel et al. | |
| 2015/0342085 | A1 * | 11/2015 | Mckervey | H05K 7/20409 165/80.3 |
| 2017/0101992 | A1 | 4/2017 | Borg et al. | |
| 2018/0023593 | A1 * | 1/2018 | Fujiki | F02B 39/16 310/68 D |
| 2018/0076693 | A1 | 3/2018 | Sturm et al. | |
| 2018/0219454 | A1 | 8/2018 | Hangari | |
| 2018/0328356 | A1 | 11/2018 | Ortiz et al. | |
| 2021/0277915 | A1 * | 9/2021 | Miller | H02K 11/33 |

FOREIGN PATENT DOCUMENTS

| | | | | |
|---|---|---|---|---|
| EP | 0724324 | A2 | 7/1996 | |
| EP | 0926805 | A2 | 6/1999 | |
| EP | 1511156 | A2 | 3/2005 | |
| EP | 2469689 | A2 | 6/2012 | |
| EP | 2482428 | A2 * | 8/2012 | H02K 11/05 |
| EP | 3252934 | A1 | 12/2017 | |
| JP | H11341743 | A | 12/1999 | |
| JP | 2012110151 | A | 6/2012 | |
| JP | 2012157194 | A * | 8/2012 | H02K 11/049 |
| WO | 2005043720 | A1 | 5/2005 | |
| WO | 2013014832 | A1 | 1/2013 | |
| WO | 2016162130 | A1 | 10/2016 | |
| WO | 2017066165 | A1 | 4/2017 | |
| WO | 2017090291 | A1 | 6/2017 | |
| WO | 2018104719 | A1 | 6/2018 | |

OTHER PUBLICATIONS

Extended European Search Report, European Application No. 21161379.9, mailed Jul. 12, 2021, 10 pages.

Examination Report No. 1 received for Australian Patent Application No. 2021201467, mailed on Oct. 24, 2025, 5 pages.

* cited by examiner

PUMP ASSEMBLY AND IMPROVED FAN SHROUD THEREFOR

CROSS-REFERENCE TO RELATED APPLICATIONS

This application claims priority under 35 U.S.C. § 119 to U.S. Provisional Application No. 62/986,417 filed on Mar. 6, 2020, the entire disclosure of which is incorporated herein by reference.

BACKGROUND

Aquatic systems, such as swimming pools, commonly use motorized pumps to move volumes of water into and across various systems. The pumps are powered by motor and drive components to form a pump assembly that is typically used in connection with other aquatic system components to recirculate, heat, cool, chemically treat, and/or filter the water in the swimming pool, spa, or other type of aquatic system. Conventional pump assemblies utilize a fan-based cooling system to cool the motor and drive components, which produce heat during operation of the pump.

FIGS. 1A-2B illustrate a conventional pump assembly and its cooling operation. A fan attached to a rotor portion of the motor draws cool air in at a rear bell end of the motor, and a small fan shroud is attached to the rear bell end of the motor, covering the fan. As best shown in FIG. 2A, fan shrouds of conventional systems typically extend over only the rear bell end of the motor and are configured to direct a portion of the drawn-in air over fins of a drive heat sink while the remainder of the air is directed horizontally across the surface of the motor housing to collectively cool the motor and drive components. FIG. 2B illustrates the conventional pump assembly with the fan shroud removed, exposing the fan and the fins of the drive heat sink.

While the fan shroud cooling system for conventional type pump assemblies provide cooling for the motor and drive components during operation of the pump via the drawn-in cool air, the process can present some inefficiencies. Not only does a significant amount of cool air directed across the motor housing dissipate before traveling the entire length of the motor, but the partitioning of air between the motor and the drive heat sink means that the drive encounters less of the cool air. Each of these factors can reduce the effectiveness and efficiency of the fan shroud cooling systems currently used in conventional pump assemblies. Accordingly, a need exists for a more effective and efficient fan shroud cooling system for pump assemblies to cool the motor and drive components of the assembly.

SUMMARY

Some embodiments provide a fan shroud for a pump assembly having a pump, a motor, and a drive. The fan shroud includes a fan shroud end cap coupled to a rear bell end of the motor, the fan shroud end cap having a vented surface for receiving cool air drawn by a motor fan during operation of the motor. The fan shroud further includes an extended shell sidewall extending from the fan shroud end cap across a length of the motor, and the fan shroud end cap and the extended shell sidewall are configured to surround the motor.

In some forms, the fan shroud is configured to direct the cool air drawn through the fan shroud end cap across a drive heat sink connected to the drive after directing the cool air across the motor. The extended shell sidewall extends up to, and abuts a seal plate of the pump. Further, the extended shell sidewall is spaced apart from the motor along the length of the motor to allow air flow from the fan shroud end cap to the seal plate. In some forms, the extended shell sidewall extends along substantially an entire length of the motor. The fan shroud can further include an end enclosure configured to enclose the extended shell sidewall around an end of the motor opposite the fan shroud end cap.

In some forms, the fan shroud includes a heat sink enclosure extending from the extended shell sidewall and surrounding a heat sink of the drive, and the heat sink enclosure includes one or more vents. The one or more vents can be positioned adjacent fins that extend from the heat sink and downward from the drive. In some forms, the one or more vents include a plurality of vent openings and a portion of the plurality of vent openings are blocked. The plurality of vent openings can include rear vents near the fan shroud end cap that are blocked and front vents near a seal plate of the pump that are fully open. In some embodiments, the portion of the plurality of vent openings that are blocked are blocked along one of a horizontal direction from the fan shroud end cap toward a seal plate of the pump, a vertical direction from the motor toward the drive, or a diagonal direction. In some forms, the plurality of vent openings is formed as a lattice of honeycombs.

Some embodiments provide a pump assembly configured for moving water through an aquatic system. The pump assembly includes a pump unit, a housing surrounding the pump unit, a motor coupled to the pump unit and extending away from the housing, the motor configured to power the pump unit. The pump assembly further includes a drive for controlling the motor, a drive heat sink adjacent the motor, and a fan shroud cooling system at least partially enclosing the motor. In some forms, the fan shroud cooling system is configured to direct cool air drawn through the fan shroud cooling system across a portion of the motor and then across a portion of the drive heat sink. The fan shroud cooling system can include a fan shroud end cap connected to, and secured around, a rear end portion of the motor, the fan shroud end cap having a vented surface for receiving cool air drawn by a motor fan during operation of the pump assembly. The fan shroud cooling system can include an extended shell sidewall extending from the fan shroud end cap across a length of the motor, and the fan shroud end cap and the extended shell sidewall substantially enclose the motor.

In some forms, the fan shroud cooling system further includes an end enclosure configured to enclose the extended shell sidewall around a front end of the motor where the motor connects to the housing surrounding the pump unit. In some forms, the extended shell sidewall abuts a seal plate of the housing to enclose an end of the motor opposite the fan shroud end cap. The fan shroud cooling system can include an opening defined through the extended shell sidewall along an upper portion of the extended shell sidewall below the drive heat sink. The fan shroud cooling system can further include a heat sink enclosure extending from the extended shell sidewall and substantially enclosing the drive heat sink, and the heat sink enclosure includes one or more vented surfaces. In some embodiments, the fan shroud cooling system is configured to direct cool air drawn in through the fan shroud end cap across a substantial length of the motor and then across the drive heat sink after exiting the fan shroud cooling system through the opening

DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1A:
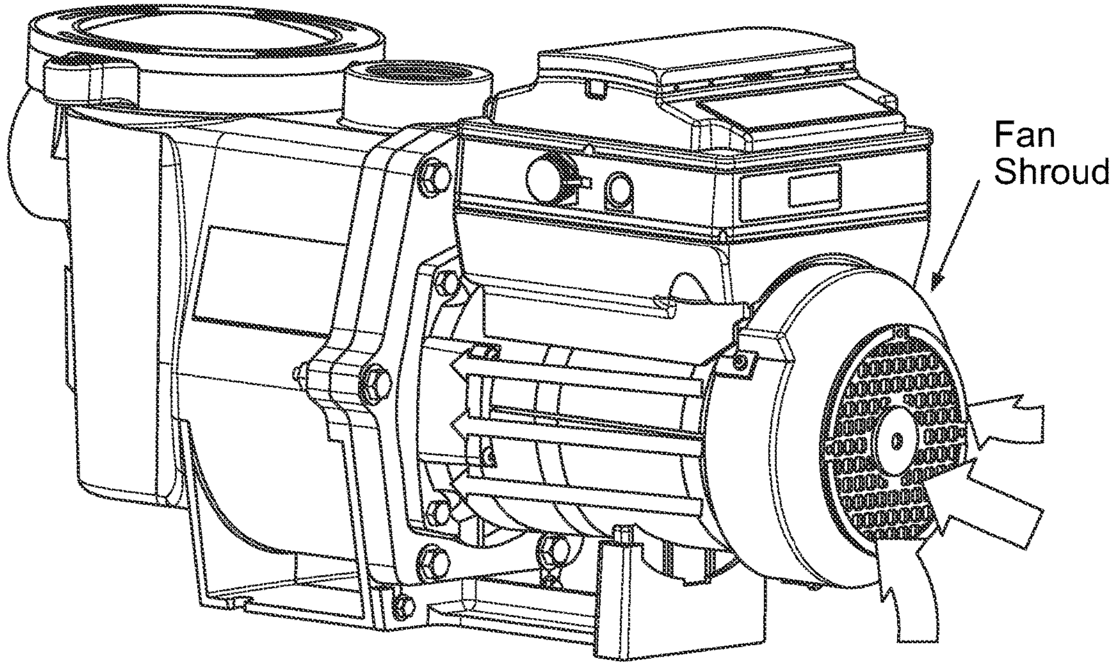
FIG. 1A (Prior Art)
FIG. 1A is a rear isometric view of a conventional prior art pump assembly illustrating the fan shroud cooling system for the motor and drive components.
Figure 1B:
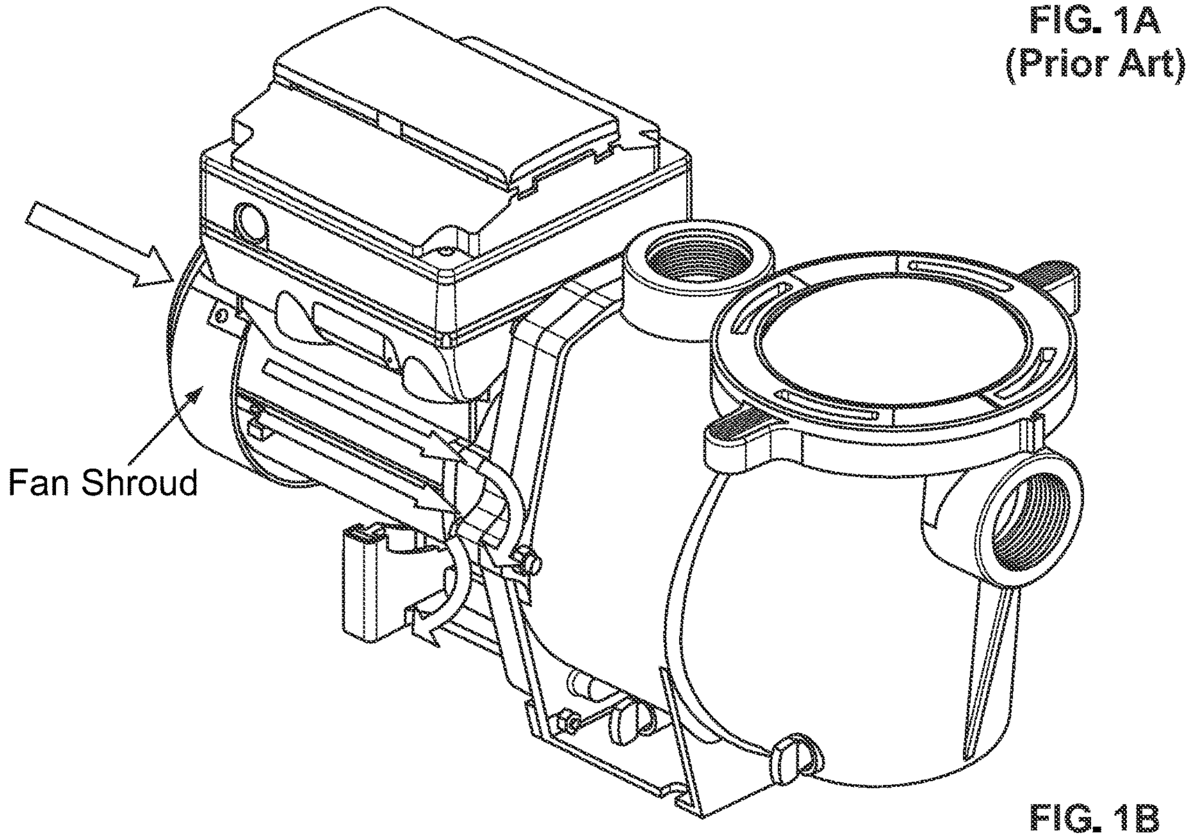
FIG. 1B (Prior Art)
FIG. 1B is a front isometric view of the conventional prior art pump assembly of FIG. 1A.
Figure 2A:
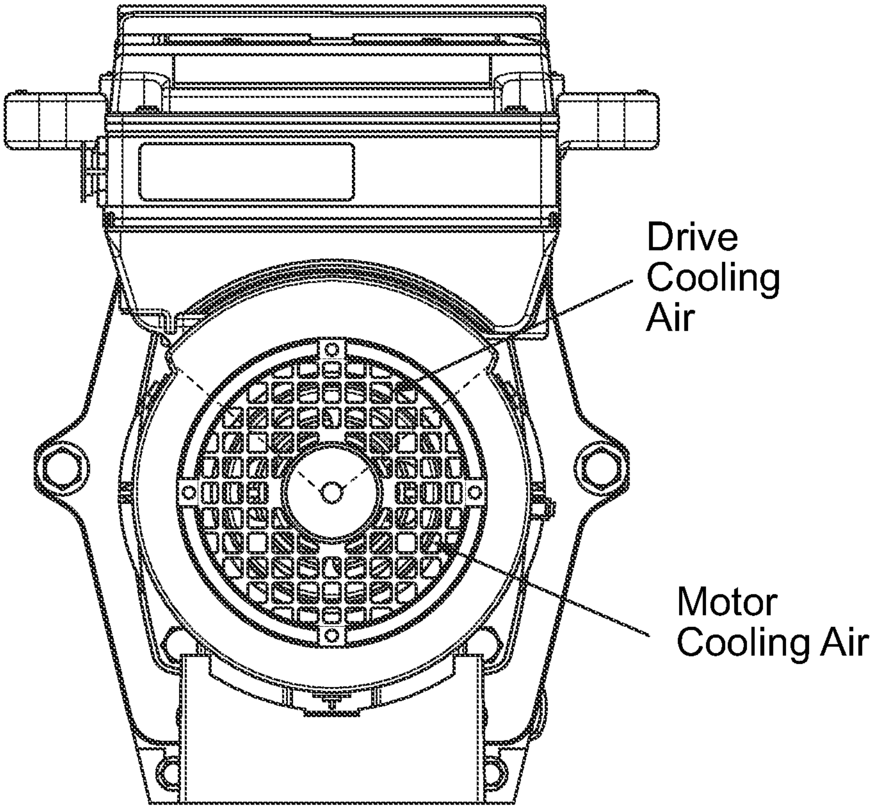
FIG. 2A (Prior Art)
FIG. 2A is a rear elevational view of the conventional prior art pump assembly of FIG. 1.
Figure 2B:
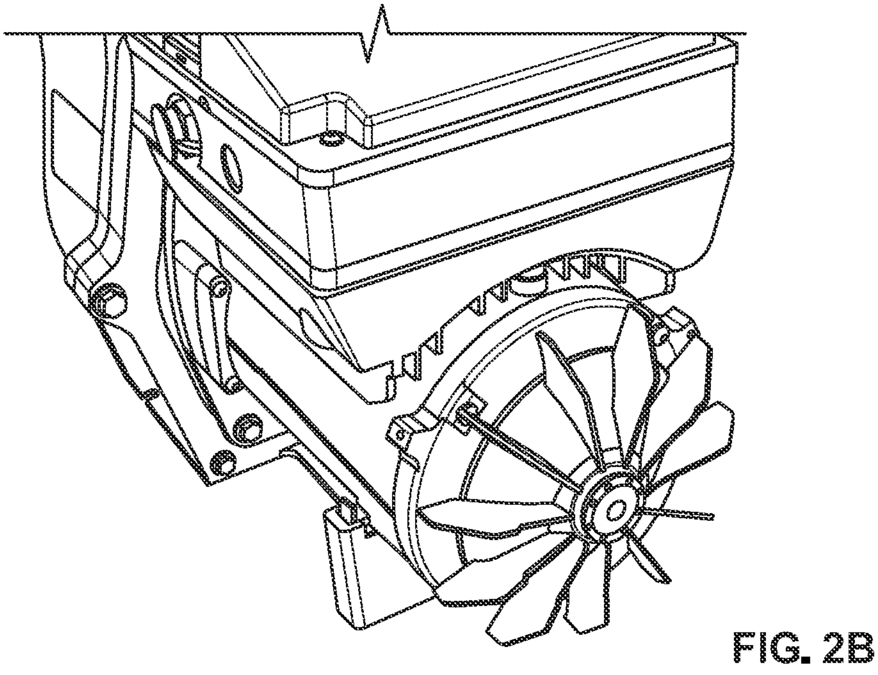
FIG. 2B (Prior Art)
FIG. 2B is a partial rear isometric view of the conventional prior art pump assembly of FIG. 1 with some portions removed for clarity.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, the terms “mounted,” “connected,” “supported,” and “coupled” and variations thereof are used broadly and encompass both direct and indirect mountings, connections, supports, and couplings. Further, unless otherwise specified or limited, “connected” and “coupled” are not restricted to physical or mechanical connections or couplings.

As used herein, unless otherwise specified or limited, “at least one of A, B, and C,” and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

Figure 3:
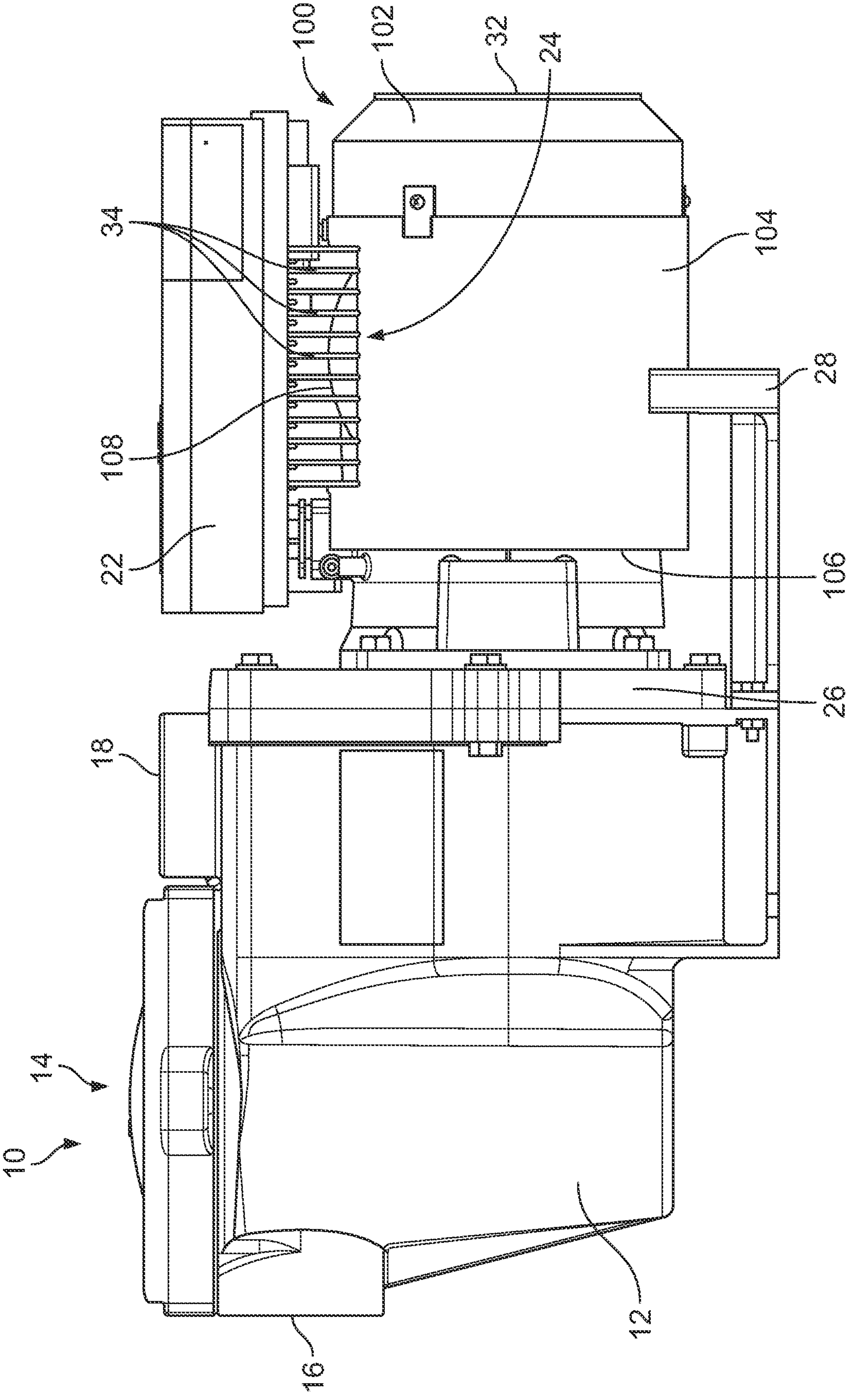
FIG. 3 is a side elevational view of a pump assembly according to an embodiment of the invention.
Figure 4:
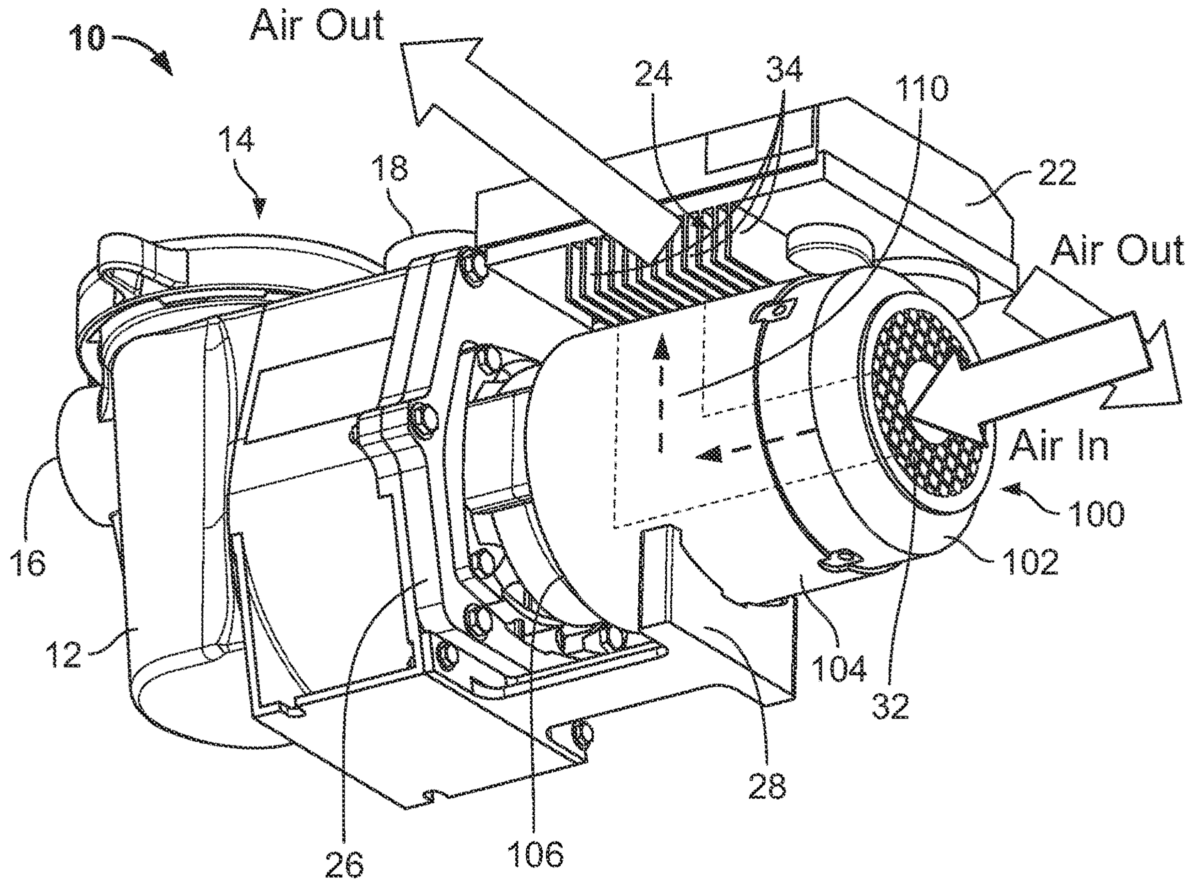
FIG. 4 is a rear, bottom, isometric view of the pump assembly of FIG. 3.

FIGS. 3 and 4 illustrate a pump assembly 10 according to one embodiment. The pump assembly 10 may be configured for use with swimming pools, spas, and other types of aquatic systems that require the movement of water. Structurally, the pump assembly 10 may include a housing 12, a pump unit 14 contained within the housing 12, an inlet port 16 for receiving water into the pump unit 14, and an outlet port 18 for expelling water from the pump unit 14. The pump unit 14 may have any suitable construction and configuration for providing a desired force to move water through an aquatic system, such as a swimming pool. According to one embodiment, the pump unit 14 may be configured as a centrifugal pump with rotatable impellers for forcing the flow of water through the pump assembly 10 from the inlet port 16 to the outlet port 18. The pump unit 14 may also be configured as any other type of motor-driven pump design suitable for forcing the flow of water.

The pump assembly 10 may further include a motor (not shown) and a control means or a drive 22 to power and operate the pump unit 14. According to one embodiment, the motor may be configured as a permanent magnet motor design to impart rotational force onto the pump unit 14. However, any other suitable motor design is considered within the scope of the present invention. The drive 22 may be configured as a variable speed drive or other suitable drive configuration for powering and controlling the motor and thereby controlling the operation of the pump unit 14. The drive 22 may also be configured with a drive heat sink 24 that is adjacent to and extends downward from the drive 22 and that dissipates the heat generated by the drive 22 during operation of the motor. The control means or drive 22 may further be configured with a control panel to facilitate the operation of the pump assembly 10.

The motor may include a rear bell end and a body extending from the rear bell end toward the housing 12. The motor may also be encased by a motor housing. A shaft portion of the motor may extend through the housing 12 and connect to the pump unit 14 to power and operate the pump unit 14. The shaft portion of the motor may be secured to the housing 12 by means of a seal plate 26 mounted to the housing 12. The pump assembly 10 may further include a base or a frame component 28 positioned below the motor and configured to secure and stabilize the motor with respect to the housing 12. The particular construction and configuration of the housing 12, the pump unit 14, the motor, and the drive 22 are not intended to be construed as limitations of the present invention.

FIGS. 3 and 4 illustrate a fan shroud 100 according to one embodiment in connection with the pump assembly 10 as described herein. The fan shroud 100 may also be configured for use with any motorized pump system that requires cooling of pump system components including a motor and a drive.

The fan shroud 100 provides airflow across various motor and drive components to cool the motor and drive components during the operation of the pump assembly 10. The fan shroud 100 may include a fan shroud end cap 102 connected to the motor of the pump assembly 10, and an extended fan shroud shell sidewall 104 that surrounds the motor. The fan shroud 100 may further include a rectilinear opening 108 located at an upper portion of the shell sidewall 104 in order to assist in distributing airflow traveling through the fan shroud 100 across the heat sink 24 of the drive 22, adjacent to the motor, as discussed in more detail below.

In some forms, the fan shroud end cap 102 may be connected to the rear bell end of motor opposite the pump unit 14. The fan shroud end cap 102 may include a circular vented surface 32 at an end thereof that permits the inflow of outside air drawn by the fan (not shown) connected to the motor. The fan shroud end cap 102 is coupled to the shell sidewall 104. The shell sidewall 104 extends away from the fan shroud end cap 102, around the body of the motor, and along substantially the entire length of the motor. The extended shell sidewall 104 may terminate at an end enclosure 106 adjacent to the seal plate 26, the seal plate 26 connecting the motor to the housing 12. The end enclosure 106 is designed to enclose a front end of the fan shroud 100 and restrict air from traveling out of the fan shroud 100 at locations other than the opening 108 in the upper portion of the shell sidewall 104. The extended shell sidewall 104 may further be configured so as to be slightly spaced apart, partially, or entirely around the circumference of the motor, in order provide an airflow pathway 110 that permits the flow of air along the length of the motor. To provide effective airflow, the extended shell sidewall 104 can be spaced apart from the motor, around the circumference of the motor, at a distance value that results in a ratio of the distance value to the diameter of the motor that is between five to one and twenty-five to one. Collectively, the fan shroud end cap 102, the shell sidewall 104, and the end enclosure 106 may substantially surround the motor, including the rear bell end, the motor body, and at least part of the shaft portion.

In some forms, the fan shroud end cap 102, the shell sidewall 104, and the end enclosure 106 surround the motor to varying degrees. For example, in some forms, the shell sidewall 104 extends around fifty to eighty percent of the circumference of the motor from the bottom of the motor around toward the drive 22 or from the top of the motor toward the frame component 28. In some forms, the shell sidewall 104 extends around seventy-five to one hundred percent of the circumference of the motor notwithstanding the opening 108. In some forms, the shell sidewall 104 extends from the fan shroud end cap 102 halfway down the length of motor to surround the motor. In some forms, the shell sidewall 104 extends from the fan shroud end cap 102 along twenty-five to one hundred percent of the length of the motor to surround the motor. Accordingly, the shell sidewall 104 surrounds the motor by extending around varying portions of the motor circumference and varying portions of the motor length.

In some embodiments, the opening 108 in the shell sidewall 104 is directly adjacent to the drive heat sink 24. The opening 108 may be located directly below the central portion of the drive heat sink 24. The heat sink 24 may include a plurality of vertical fins 34 that extend downward from the drive heat sink 24 and at least partially into the opening 108. Thus, the opening 108 is configured to permit air traveling though the fan shroud 100 to exit the fan shroud 100 by flowing past the fins 34 of the drive heat sink 24 after traveling through the extended shell sidewall 104.

As shown in FIG. 4, the fan shroud 100 is configured to direct the flow of cool air from the fan shroud end cap 102 along the body of the motor and then upward through the opening 108 and across the fins 34 of the drive heat sink 24. Cool air may be drawn into and through the fan shroud end cap 102 by the motor fan (not shown) located within the motor as the motor fan rotates during operation. Once the cool air passes through the fan shroud end cap 102, the air is forced across the surface of the motor body by the shell sidewall 104 that encloses the motor. The drawn-in air effectively cools the motor as it travels along substantially the entire length of the motor. After traveling along at least part of the length of the motor, the air is forced upward toward the opening 108 by the end enclosure 106. As the air exits the fan shroud 100 through the opening 108, it travels across the fins 34 of the drive heat sink 24 and thereby effectively cools the drive 22.

As a result of the configuration of the fan shroud 100, all, or substantially all, of the cool air drawn through the fan shroud 100 by the motor fan first cools the motor, and additionally cools the drive heat sink 24 and the drive 22, thereby providing an efficient path for the cooling air. The fan shroud 100 eliminates the need to separately direct airflow to the motor and the components of the drive 22 of the pump assembly 10, providing more efficient cooling of the motor and the drive 22 during operation of the pump assembly 10.

Figure 5:
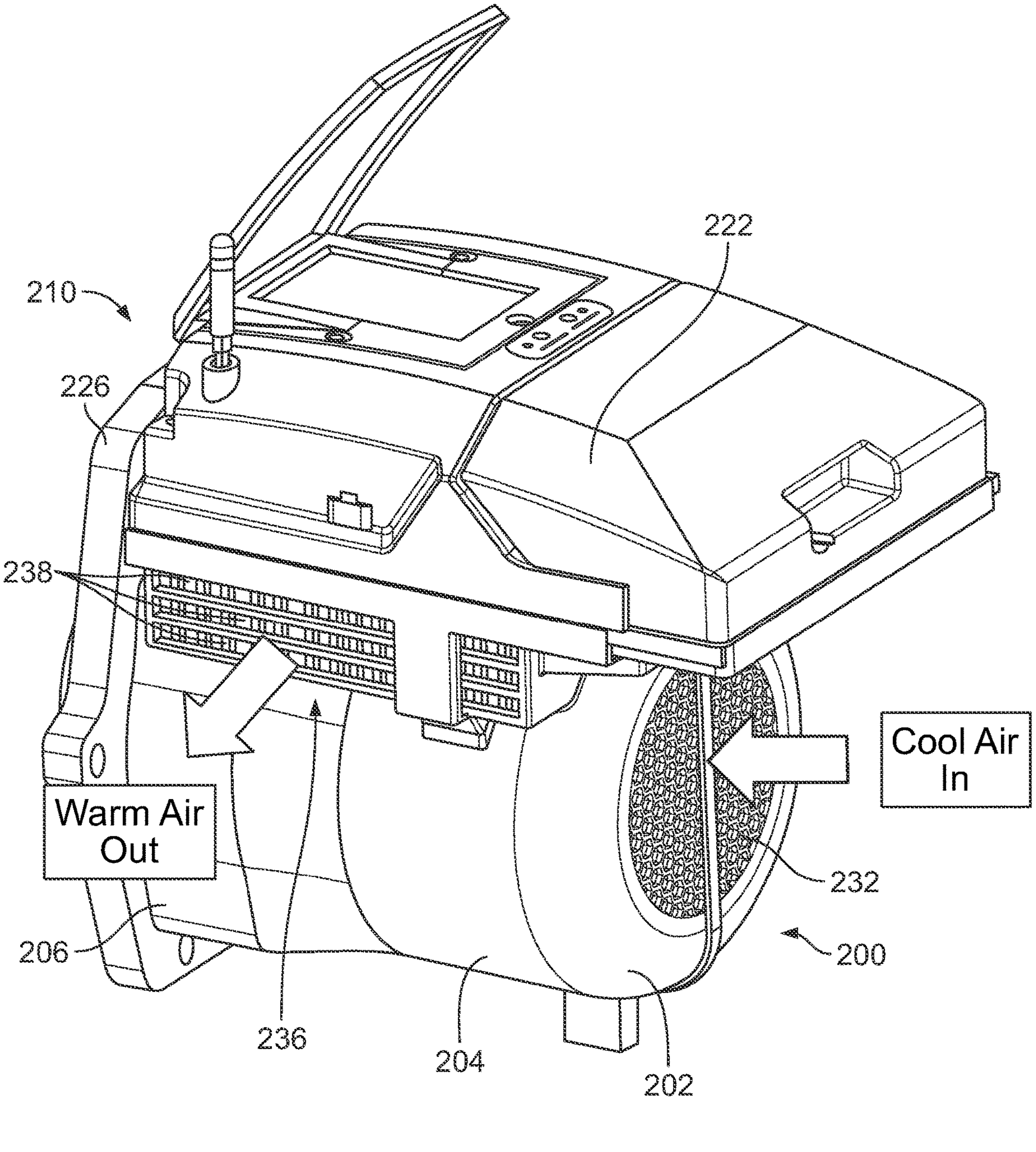
FIG. 5 is a partial rear isometric view of a pump assembly according to one embodiment.

A pump assembly 210 according to another embodiment is illustrated in FIG. 5. Similar to the pump assembly 10 described above with respect to FIGS. 3 and 4, the pump assembly 210 includes a seal plate 226, a motor (not shown), a motor fan attached to the motor (not shown), a drive 222, and a fan shroud 200. The fan shroud 200 includes a fan shroud end cap 202 with a vented surface 232 in an end thereof, and an extended shell sidewall 204. The fan shroud 200 extends from a rear bell end of the motor, across a motor body, and extends to, and terminates at, the seal plate 226 at an end enclosure 206. The extended shell sidewall 204 thus abuts the seal plate 226 and covers a shaft portion of the motor. Collectively, the fan shroud end cap 202 and the extended shell sidewall 204 may substantially enclose the motor, including both the rear bell end, the motor body, and at least part of the shaft portion.

In addition, the fan shroud 200 includes a heat sink enclosure 236 that extends outward and upward from the extended shell sidewall 204 and surrounds a heat sink of the drive 222. The heat sink enclosure 236 includes slotted louvers 238 to direct air flow from the fan shroud end cap 202 out through the slotted louvers 238. The heat sink enclosure 236 can ensure that air effectively flows past the fins (not shown) of the heat sink, cooling off the drive 222. During operation, the motor fan draws air in through the vented surface 232 of the fan shroud end cap 202, and the extended shell sidewall 104 directs air across the motor, up to and across the fins of the drive heat sink, and out through the slotted louvers 238. Additionally, the slotted louvers 238 can be manufactured to be selectively closed along the length of the heat sink enclosure 236. For example, the slotted louvers 238 may be selectively closed along a horizontal length or a vertical height of the heat sink enclosure 236. In some forms, the slotted louvers 238 can be selectively closed at a diagonal angle along the heat sink enclosure 236. Accordingly, selectively closing the slotted louvers 238 encourages air drawn in through the vented surface 232 to flow across the components within the fan shroud 200 that heat the fastest or reach the highest temperatures during operation of the pump assembly 210.

Figure 6A:
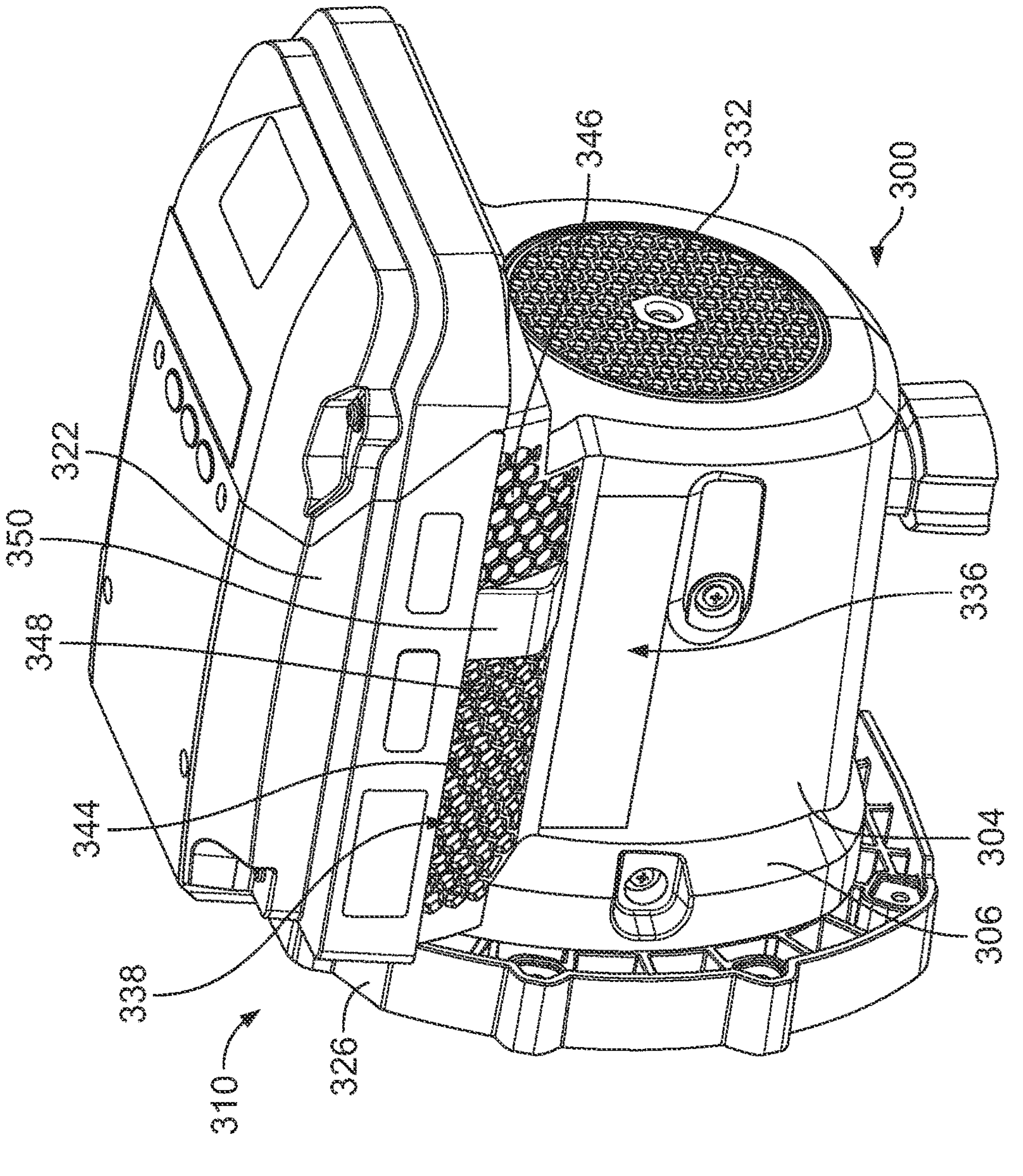
FIG. 6A is a partial rear isometric view of a pump assembly according to another embodiment.
Figure 6B:
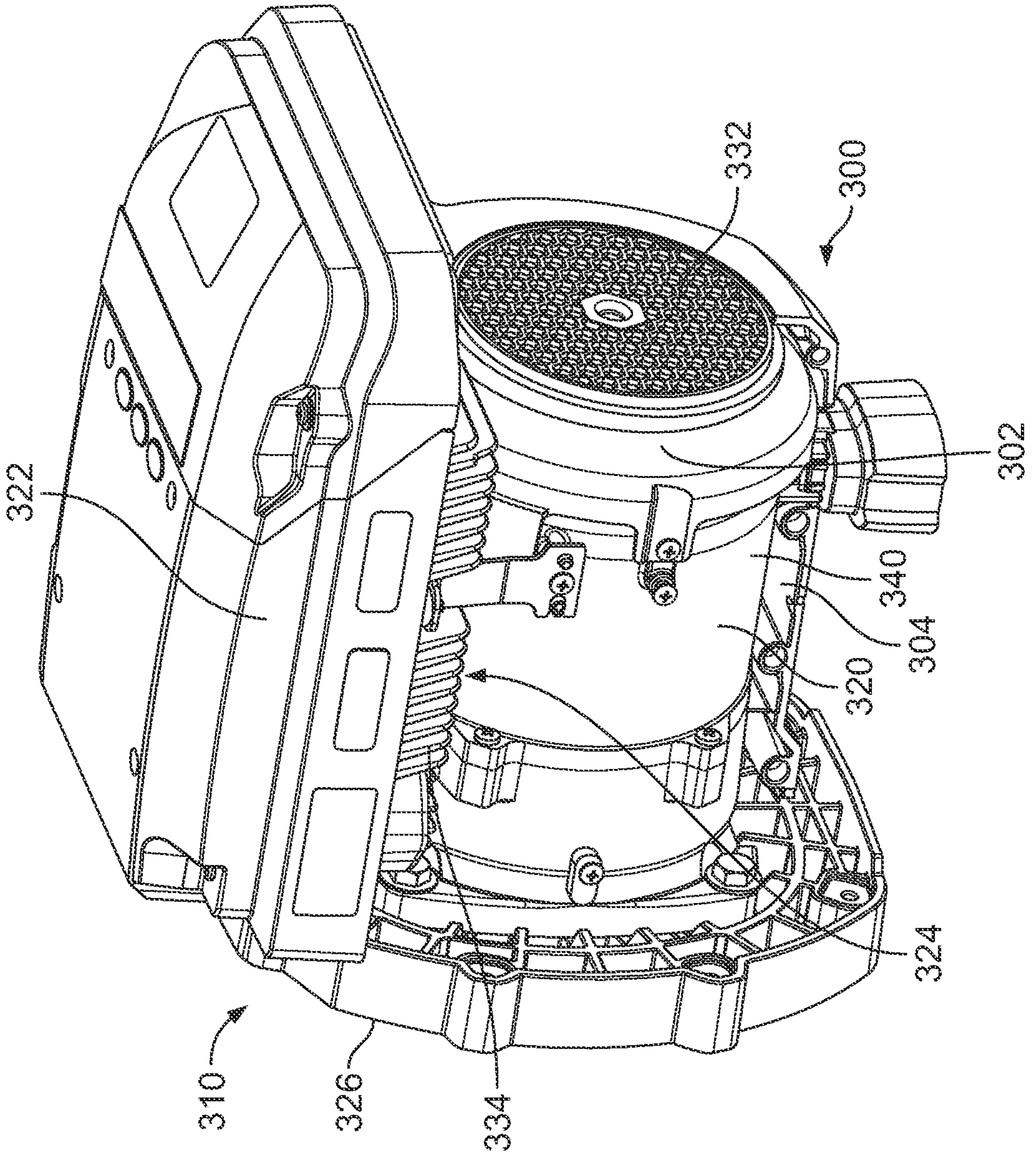
FIG. 6B is a partial rear isometric view of the pump assembly of FIG. 6A with some portions removed for clarity.
Figure 6C:
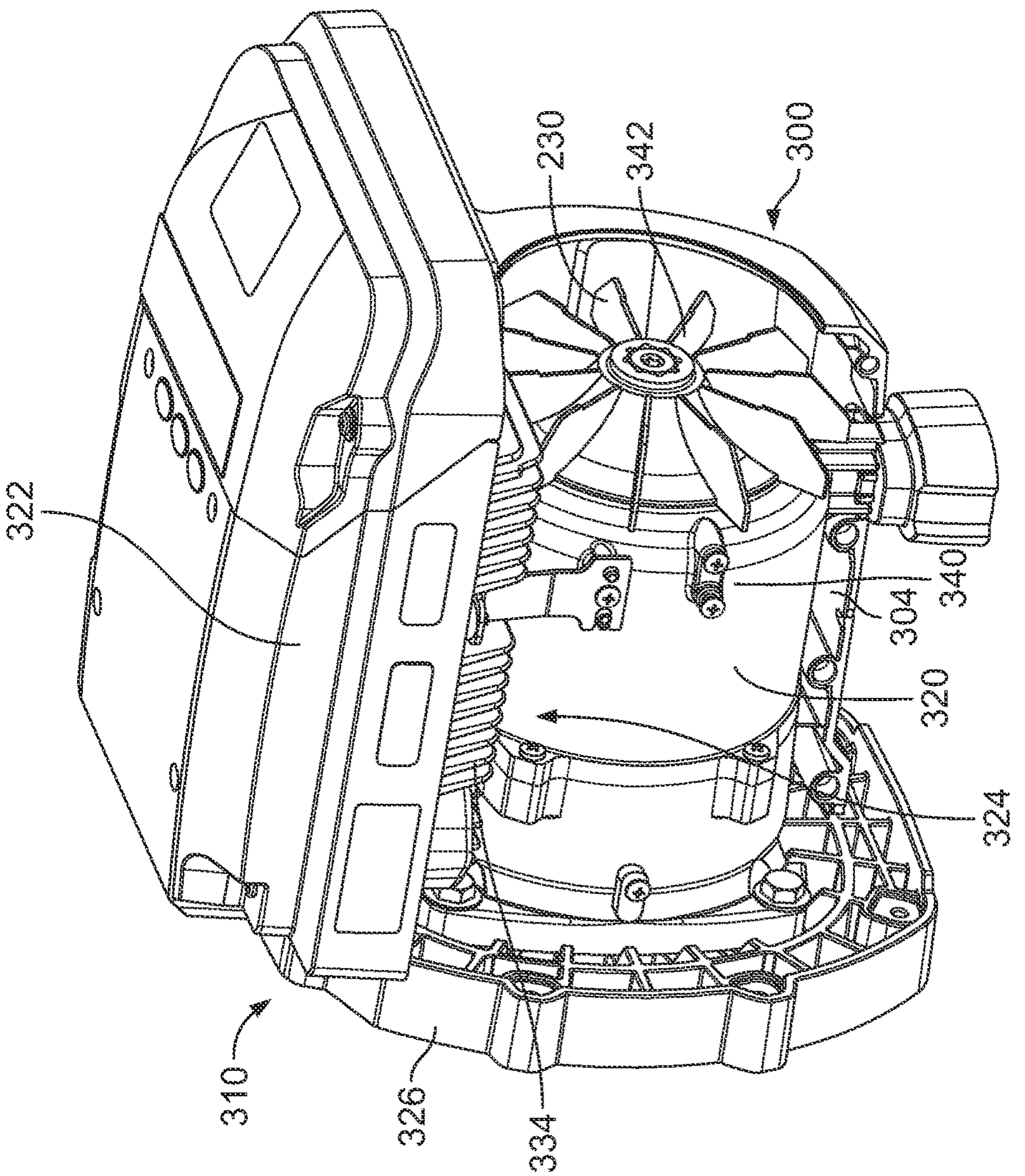
FIG. 6C is a partial rear isometric view of the pump assembly of FIG. 6A with some portions removed for clarity.

FIGS. 6A-6C illustrate a pump assembly 310 according to a further embodiment. Similar to the pump assemblies 10 and 210 described above with respect to FIGS. 3-5, the pump assembly 310 includes a seal plate 326, a motor 320 (see FIG. 6B) with a motor housing 340, a motor fan 342 attached to the motor 320, a drive 322, and a fan shroud 300. The fan shroud 300 includes a fan shroud end cap 302 with a vented surface 332, and an extended shell sidewall 304. The fan shroud 300 extends from a rear bell end of the motor 320, across the motor housing 340, and extends to, and terminates at, the seal plate 326. The extended shell sidewall 304 thus abuts the seal plate 326 to form an end enclosure 306.

Further, the fan shroud 300 can include an upper heat sink enclosure 336 that extends outward and upward from the extended shell sidewall 304 and surrounds a heat sink 324 of the drive 322. The upper heat sink enclosure 336 can include a plurality of vents 338 positioned adjacent fins 334 which extend from the heat sink 324 downward from the drive 322. During operation, the motor fan 342 draws air in through the vented surface 332 of the fan shroud end cap 302, and the extended shell sidewall 304 directs air across the motor housing 340, up to the fins 334, across the fins 334 of the drive heat sink 324, and out through the vents 338. In some embodiments, the vents 338 are positioned symmetrically on both sides of the heat sink enclosure 336 with respect to a plane extending from the rear bell end of the motor 320 toward the seal plate 326 and through a vertical axis of the motor 320.

In some forms, the shell sidewall 304 can be comprised of multiple parts that are coupled together using fasteners, connectors, adhesives, welding or other suitable connection means. For example, the shell sidewall 304 can include two halves, each half of which is secured independently to the motor housing 340. Also, the shroud end cap 302 can be fastened independently to the motor housing 340. Thus, the fan shroud 300 can comprise modular parts that can be installed or removed independently, allowing access to the motor housing 340, the motor fan 342, and the heat sink 324. Alternatively, the fan shroud 300 can be composed of a single, integral part.

In some forms, the fan shroud end cap 302, the shell sidewall 304, and the heat sink enclosure 336 surround the motor 320 to varying degrees. For example, in some forms, the shell sidewall 304 extends around fifty to eighty percent of the circumference of the motor 320 from the bottom of the motor 320 around toward the drive 322 or from the top of the motor 320 toward the bottom of the motor 320. In some forms, the shell sidewall 304 extends around seventy-five to one hundred percent of the circumference of the motor 320 notwithstanding the heat sink enclosure 336, which can fully or partially complete the enclosing of the remaining circumference of the motor 320 not surrounded by the shell sidewall 304.

In some forms, the shell sidewall 304 extends from the fan shroud end cap 302 halfway down the length of motor 320 to surround the motor. In some forms, the shell sidewall 304 extends from the fan shroud end cap 302 along the twenty-five to one hundred percent of length of the motor 320 to surround the motor 320. Further, the shell sidewall 304 can include internal baffles that extend around at the motor 320. For example, in some forms, the shell sidewall 304 includes one or more arcuate baffles that extend partially around the circumference of the motor housing 340 between the motor 320 and the heat sink 324. The arcuate baffles encourage air to flow adjacent to the motor housing 340 and further around the outside of the motor housing 340 toward the top of the motor 320 and toward the center of the heat sink 324 before exiting the fan shroud 300 via the vents 338. Accordingly, the shell sidewall 304, the fan shroud end cap 302, and the heat sink enclosure 336 surround the motor by extending around varying portions of the motor circumference and varying portions of the motor length.

Generally, the vents 338 may be provided in the form of vent openings 344 that can be formed in a number of shapes to facilitate air flow. More specifically, the vent openings 344 may be defined by a matrix or lattice of honey combs or angled slats as depicted in the embodiments described herein. Further, the vents 338 can be manufactured to be partially blocked along the length of the heat sink enclosure 336. For example, the vent openings 344 depicted in FIGS. 6A-7C may be provided in the form of a first rear vent section 346 and a second front vent section 348. The first rear vent section 346 extends from adjacent the shroud end cap 302 to a divider 350, and the second front vent section 348 extends from the divider 350 to adjacent the seal plate 326. In some forms, the divider 350 is replaced with additional vent openings 344. As shown in FIGS. 6A-6C, the first rear vent section 346 is entirely closed to prevent airflow, and the second front vent section 348 is entirely open to allow airflow. Accordingly, the vent openings 344 are open for a length comprising about fifty percent of the length of the heat sink enclosure 336, from the divider 350 to adjacent the seal plate 326.

The vent openings 344 of the rear vent section 346 can be partially or fully blocked to prevent airflow, and the vent openings 344 of the front vent section 348 can be partially or fully open to allow air to pass through. By partially or fully blocking the rear vent section 346, the heat sink enclosure 336 prevents air from exiting the fan shroud 300 too early or until the air has traveled farther away from the fan shroud end cap 302 and across the surface of the motor housing 340 if the rear vent section 346 was not partially or fully blocked. The blocked vents and the unblocked vents can be distributed along the heat sink enclosure 336 in various ratios.

Figure 7A:
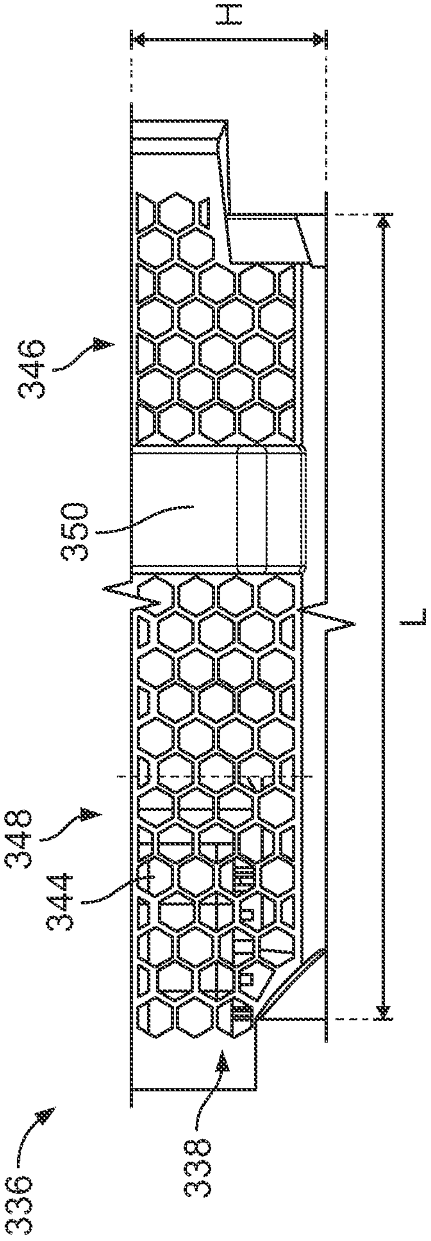
FIG. 7A is a partial side view of one embodiment of the pump assembly of FIG. 6A

For example, as shown in FIG. 7A, in one embodiment, all of the vent openings 344 in the rear vent section 346 are blocked, and some of the vent openings 344 in the front vent section 348 are blocked along at least part of a horizontal length L of the heat sink enclosure 336. Thus, the vent openings 344 are open for a length comprising less than fifty percent of the horizontal length L of the heat sink enclosure 336. In some forms, two-thirds of the vent openings 344 may be blocked along the horizontal length L of the heat sink enclosure 336 and one-third of the vent openings 344 may be open. Any ratio of the vent openings 344 of one or both of the front vent section 348 and the rear vent section 346 may be blocked or open along at least part of the horizontal length L of the heat sink enclosure 336.

Figure 7B:
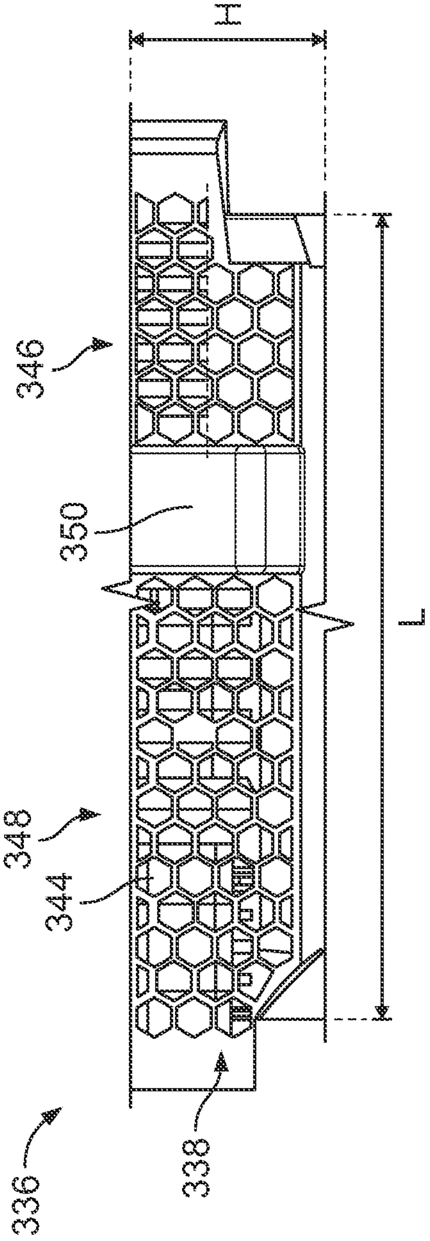
FIG. 7B is a partial side view of one embodiment of the pump assembly of FIG. 6A.

As shown in FIG. 7B, in some forms, all of the vent openings 344 of the front vent section 348 are open, and some of the vent openings 344 of the rear vent section 346 are blocked along about fifty percent of a vertical height H of the heat sink enclosure 336. In some forms, two-thirds of the vent openings 344 may be blocked along part of the vertical height of the heat sink enclosure 336 and one-third of the vent openings 344 may be open. Any ratio of the vent openings 344 of one or both of the front vent section 348 and the rear vent section 346 may be blocked or open along at least part of the vertical height H of the heat sink enclosure 336.

Figure 7C:
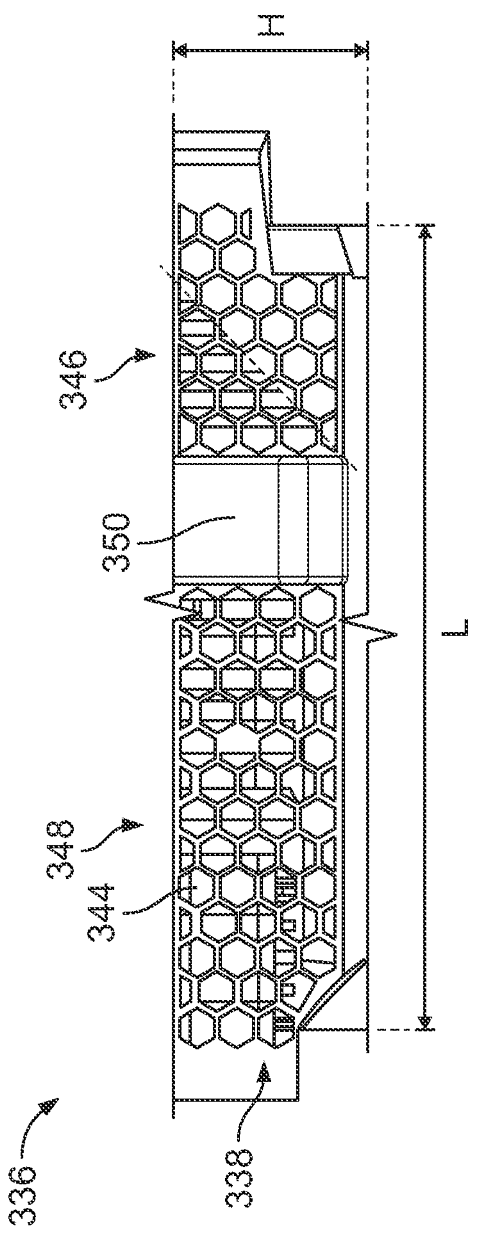
FIG. 7C is a partial side view of one embodiment of the pump assembly of FIG. 6A.

As shown in FIG. 7C, in some forms, all of the vent openings 344 of the front vent section 348 are open, and some of the vent openings 344 of the rear vent section 346 are blocked diagonally along part of the horizontal length L and part of the vertical height H of the heat sink enclosure 336. Any ratio of the vent openings 344 of one or both of the front vent section 348 and the rear vent section 346 of the heat sink enclosure 336 may be blocked diagonally at a variety of diagonal angles while the remaining vent openings 344 are open.

Although FIGS. 7A-C illustrate blocking the vent openings 344 along a horizontal length L of the heat sink enclosure 336, along a vertical height H of the heat sink enclosure 336, and along a diagonal angle of the heat sink enclosure 336 respectively, any combination of these configurations can be provided. For example, part of the vent openings 344 of the rear vent section 346 can be blocked along a diagonal angle, while also part of the vent openings 344 of the front vent section 348 can be blocked along the horizontal length L and part of the vent openings 344 of the front vent section 348 can be blocked along the vertical height H of the heat sink enclosure 336.

Further, in some forms, although the vents 338 can be positioned symmetrically on either side of the heat sink enclosure 336, with respect to the plane extending from the rear bell end of the motor 320 toward the seal plate 326 and through a vertical axis of the motor 320, the selective blocking of vent openings 344 can be arranged asymmetrically with respect to one side of the heat sink enclosure 336 versus the other (other side not shown). For example, the rear vent section 346 may be blocked on one side of the heat sink enclosure 336 according to any of the arrangements listed above but be blocked according to another of the arrangements listed above on the other side of the heat sink enclosure 336. By asymmetrically blocking the vents 338 with respect to the plane extending from the rear bell end of the motor 320 toward the seal plate 326 and through a vertical axis of the motor 320, a higher airflow is encouraged on one side of the heat sink enclosure 336 versus the other to provide a lateral bias of airflow.

Accordingly, the selective arrangement of blocked/open vent openings 344 can force air drawn-in through the vented surface 332 and along the parts of the motor housing 340 and the heat sink 324 that heat the fastest or reach the highest temperatures during operation of the pump assembly 310. For example, the selective arrangement of blocked/open vent openings 344 can be used to target high heat areas of the drive 322 that occur in localized positions along the horizontal length L, the vertical height H, or on a particular side of the heat sink enclosure 336.

The fan shroud 100, 200, 300 (and the components thereof) may be constructed from any suitable material, including without limitation, plastic or polymer-based materials, metals, composites, or any combination thereof. As described herein, the fan shroud 100, 200, 300 may form a substantially enclosed shell or enclosure around the motor 320 and may function to protect the motor 320 from damage and/or environmental effects (such as rain, moisture, heat, etc.). As a result, the fan shroud 100, 200, 300 may reduce or eliminate the need for the housing of the motor 320 to be coated or treated to protect against moisture and environmental effects, which can reduce the costs of the components of the motor 320 and/or the pump assembly 10, 210, 310.

From the foregoing, it will be seen that this invention is one well-adapted to attain all the ends and objects set forth above together with other advantages which are obvious and which are inherent to the structure. It will be understood that certain features and -subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A fan shroud for a pump assembly having a pump, a motor, a seal plate, and a drive, the fan shroud comprising:

a fan shroud end cap coupled to a rear end of the motor, the fan shroud end cap having a vented surface for receiving air drawn by a motor fan during operation of the motor;

an extended shell sidewall extending from the fan shroud end cap, across a length of the motor, and adjacent to the seal plate of the pump;

a first wall extending upwardly and outwardly from the extended shell sidewall on a first side of the fan shroud; and a second wall extending upwardly and outwardly from the extended shell sidewall on a second side of the fan shroud, wherein the first wall and the second wall each include a vent section adjacent to a drive heat sink of the drive, each vent section including at least one vent opening, wherein the fan shroud end cap and the extended shell sidewall are configured to surround the motor, wherein the extended shell sidewall includes a baffle extending partially around a circumference of the motor between the motor and the drive heat sink, and wherein the baffle is configured to direct the air circumferentially around the motor toward a center of the drive heat sink before exiting the fan shroud via the vent openings of the first and second walls.

2. The fan shroud of claim 1, wherein the fan shroud is configured to direct the air drawn through the fan shroud end cap across the drive heat sink connected to the drive after directing the air across the motor.

3. The fan shroud of claim 2, wherein a first portion of the fan shroud end cap extends between and separates the motor fan from a first portion of the drive heat sink.

4. The fan shroud of claim 1, wherein the extended shell sidewall is spaced apart from the motor along the length of the motor to allow air flow from the fan shroud end cap to the seal plate.

5. The fan shroud of claim 1, wherein the length is substantially an entire length of the motor.

6. The fan shroud of claim 1, wherein the extended shell sidewall abuts the seal plate to form an end enclosure configured to enclose an end of the motor opposite the fan shroud end cap.

7. The fan shroud of claim 1, wherein the fan shroud is configured to direct the air drawn in through the fan shroud end cap across the motor and then redirect the air to the drive heat sink, wherein the air is directed along fins of the drive heat sink before exiting through the vent sections.

8. The fan shroud of claim 1, wherein each vent section is positioned adjacent to fins that extend from the drive heat sink and downward from the drive.

9. The fan shroud of claim 1, wherein each vent section includes a lattice of honeycombs, and wherein a first portion of the lattice of honeycombs is provided in the form of a plurality of vent openings, and a second portion of the lattice of honeycombs is blocked.

10. The fan shroud of claim 9, wherein the second portion of the lattice of honeycombs is near the fan shroud end cap and the first portion of the lattice of honeycombs comprises front vents near the seal plate of the pump.

11. The fan shroud of claim 9, wherein the second portion of the lattice of honeycombs is blocked along one of a horizontal direction from the fan shroud end cap toward the seal plate of the pump, a vertical direction from the motor toward the drive, or a diagonal direction.

12. The fan shroud of claim 1, wherein the fan shroud end cap extends toward the seal plate and past the motor fan.

13. A pump assembly configured for moving water through an aquatic system, the pump assembly comprising:

a pump unit;

a housing surrounding the pump unit;

a motor coupled to the pump unit and extending away from the housing, the motor configured to power the pump unit;

a drive for controlling the motor;

a drive heat sink adjacent the motor; and a fan shroud cooling system at least partially enclosing the motor, the fan shroud cooling system including:

an extended shell sidewall extending across a length of the motor, a heat sink enclosure extending from the extended shell sidewall and substantially enclosing the drive heat sink, a first vent positioned on a first lateral wall of the heat sink enclosure, and a second vent positioned on a second lateral wall of the heat sink enclosure, wherein the second lateral wall is opposite the first lateral wall, and the first and second lateral walls flare upwardly and away from one another as the first and second lateral walls extend from the motor toward the drive, wherein the extended shell sidewall includes a baffle extending partially around a circumference of the motor between the motor and the drive heat sink, and wherein the baffle is configured to direct air circumferentially around the motor toward a center of the drive heat sink before exiting the heat sink enclosure via the first vent and the second vent of the first lateral wall and the second lateral wall.

14. The pump assembly of claim 13, wherein the fan shroud cooling system is configured to direct the air drawn through the fan shroud cooling system across a portion of the motor and then across a portion of the drive heat sink.

15. The pump assembly of claim 13, wherein the fan shroud cooling system further comprises a fan shroud end cap connected to and secured around a rear end portion of the motor, the fan shroud end cap having a vented surface for receiving the air drawn by a motor fan during operation of the pump assembly, and wherein the fan shroud end cap and the extended shell sidewall substantially enclose the motor.

16. The pump assembly of claim 13, wherein the fan shroud cooling system further comprises an end enclosure configured to enclose the extended shell sidewall around a front end of the motor where the motor connects to the housing surrounding the pump unit, wherein the end enclosure is formed by the extended shell sidewall and a seal plate of the pump unit.

17. The pump assembly of claim 13, wherein the fan shroud cooling system is configured to direct the air drawn in through a fan shroud end cap across a substantial length of the motor and then across the drive heat sink before exiting the fan shroud cooling system through the first vent and the second vent.

18. The pump assembly of claim 13, wherein the first lateral wall and the second lateral wall of the heat sink enclosure extend outward and upward from the extended shell sidewall.

19. The pump assembly of claim 13, further comprising heat sink fins extending from the drive heat sink, wherein the heat sink fins are arranged perpendicular to a longitudinal axis of the motor.

* * * * *